United States Patent [19]

Ogata

[11] Patent Number: 5,069,536

[45] Date of Patent: Dec. 3, 1991

[54] ZOOM LENS SYSTEM

[75] Inventor: Yasuji Ogata, Tokyo, Japan

[73] Assignee: Olympus Optical Company, Ltd., Tokyo, Japan

[21] Appl. No.: 358,434

[22] Filed: May 30, 1989

[30] Foreign Application Priority Data

May 31, 1988 [JP] Japan .................................. 63-131626
Dec. 28, 1988 [JP] Japan .................................. 63-329189

[51] Int. Cl.$^5$ .............................................. G02B 15/00
[52] U.S. Cl. ..................................... 359/689; 359/791
[58] Field of Search ......................... 350/423, 427, 477

[56] References Cited

U.S. PATENT DOCUMENTS

| 4,673,258 | 6/1987 | Masumoto | 350/423 |
| 4,773,744 | 9/1988 | Yamanashi | 350/427 |
| 4,854,682 | 8/1989 | Yamanashi | 350/427 |

FOREIGN PATENT DOCUMENTS

| 57-201213 | 12/1982 | Japan . |
| 58-184916 | 10/1983 | Japan . |
| 62-78522 | 4/1987 | Japan . |
| 63-17422 | 1/1988 | Japan . |

Primary Examiner—Paul M. Dzierzynski
Attorney, Agent, or Firm—Cushman, Darby & Cushman

[57] ABSTRACT

A zoom lens system comprising, in the order from the object side, a first lens unit having positive refractive power, a second lens unit having positive refractive power and a third lens unit having negative refractive power, and so adapted as to vary focal length from the wide position to the tele position by displacing the first lens unit integrally with the third lens unit toward the object side and displacing the second lens unit toward the object side at a speed slower than that of the first lens unit, said zoom lens system having such a composition as to permit simplifying structure of the driving mechanism for varying focal length, a compact design and favorable performance.

7 Claims, 10 Drawing Sheets

ZOOM LENS SYSTEM

BACKGROUND OF THE INVENTION a) Field of the Invention

The present invention relates to a compact zoom lens system consisting of three lens groups.

b) Description of the Prior Art

In the recent years where lens shutter cameras are designed for more sophisticated functions, it is strongly demanded to equip the cameras with zoom lens systems. Out of the zoom lens systems so far proposed to cope with this demand, there is known the zoom lens system disclosed by Japanese Unexamined Published Patent Application No. 184916/58. This lens system consists of a first lens group having positive refractive power, a second lens group having positive refractive power and a third lens group having nagative refractive power, and is so adapted as to vary focal length from the wide position to the tele position by displacing the lens groups independently toward the object side. Judging from the lens composition, this zoom lens system can be regarded as a modification of the zoom lens system consisting of two lens groups which was disclosed by Japanese Unexamined Published Patent Application No. 201213/57, and the second lens group is displaced for a very short distance for varying focal length of the former zoom lens system. Further, the zoom lens system disclosed by Japanese Unexamined Published Patent Application No. 78522/62 consists of three lens groups having the above-described refractive power distribution but, judging from the compositions of the respective lens groups and description in the patent specification thereof, it can be regarded as a zoom lens system designed by integrating a second lens group with a third lens group in a zoom lens system consisting of four lens groups.

Japanese Unexamined Published Patent Application No. 17422/63 disclosed a conventional example of zoom lens system wherein refractive powers are similarly distributed, and a first lens group and a third lens group are displaced for variation of focal length. However, this zoom lens system is of an optically compensating type, designed for a low zooming ratio of 1.5 and has a total length too long to be a compact zoom lens system.

In the conventional examples described above as zoom lens systems designed for a vari-focal ratios on the order of 1.7 and consisting of three lens groups, driving mechanisms for zooming are inevitably complicated for displacing the three lens groups independently. Especially when an attempt is made to enhance the vari-focal ratio, it is more difficult to design a compact zoom lens system having a composition compatible with a simple driving mechanism.

In addition, the zoom lens system disclosed by Japanese Unexamined Published Patent Application No. 184916/58 can hardly be built in a lens shutter camera since the zoom lens system has a long total length and an extremely short back focal length which makes diameter of the third lens group as long as the diagonal line of the film.

SUMMARY OF THE INVENTION

A primary object of the present invention is to provide a compact zoom lens system having a composition enabling to simplify a driving mechanism for zooming, a high vari-focal ratio of 2 and favorable performance.

The zoom lens system according to the present invention comprises a first lens unit having positive refractive power, a second lens unit having positive refractive power and a third lens unit having negative refractive power, and is so adapted as to perform variation of focal length from the wide position to the tele position by displacing said first lens unit integrally with said third lens unit toward the object side, and displacing said second lens unit toward the object side at a speed slower than that of the first lens unit.

Owing to the fact that the first lens unit and the third lens unit are integrally displaced for zooming as described above, the zoom lens system according to the present invention enables to simplify a driving mechanism for zooming.

In order to design a compact zoom lens system having the composition described above and correct aberration favorably therein, it is desirable to select a refractive power distribution satisfying the following conditions (1) through (3):

$$2.5 < f_1/fw < 6 \tag{1}$$

$$0.6 < f_2/fw < 1 \tag{2}$$

$$2 < f_1/|f_3| < 7 \tag{3}$$

wherein the reference symbols $f_1$, $f_2$ and $f_3$ represent focal lengths of the first lens units, the second lens unit and the third lens unit respectively, and the reference symbol fw designates focal length of the zoom lens system as a whole at the wide position thereof.

Figure 1:
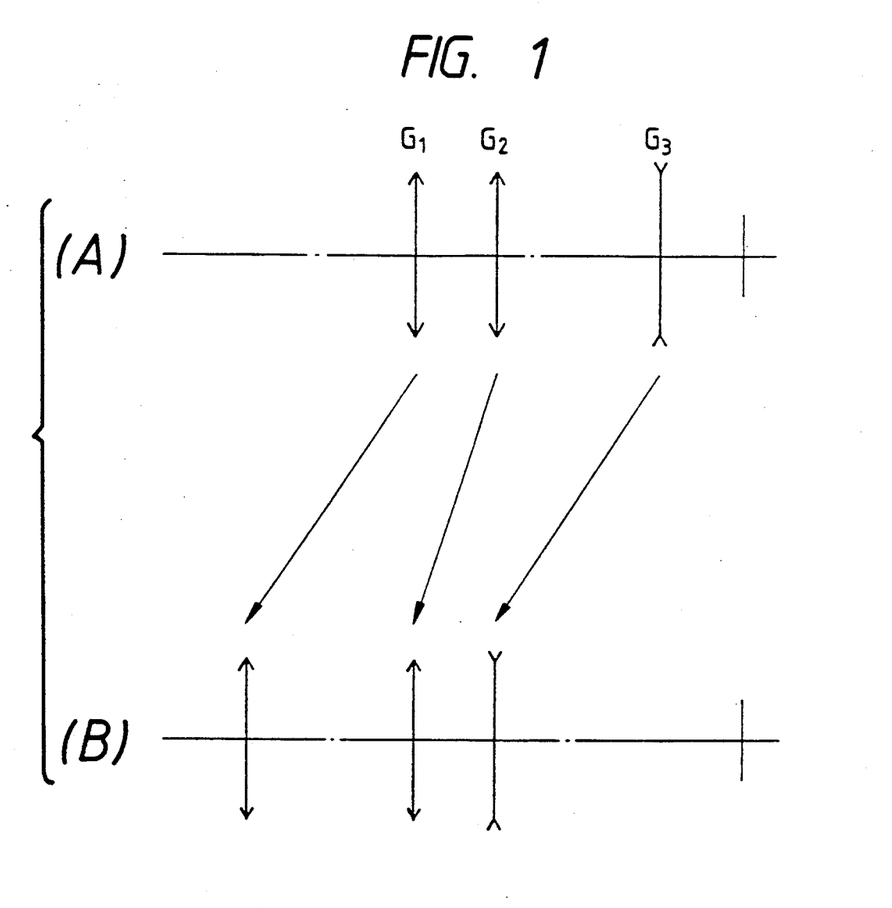
FIG. 1 shows a conceptional diagram illustrating refractive power distribution in the zoom lens system according to the present invention.

FIG. 1A and FIG. 1B show schematic diagrams illustrating the fundamental composition (distribution of refractive powers) of the zoom lens system according to the present invention, FIG. 1A corresponding to the wide position and FIG. 1B corresponding to the tele position. In these drawings, the reference symbol $G_1$ represents the first lens unit, the reference symbol $G_2$ designates the second lens unit, the reference symbol $G_3$ denotes the third lens unit and the reference symbol F represents the image surface. For varying focal length of the zoom lens system from the wide position to the tele position, the respective lens units are displaced as indicated by the arrows in these drawings. Speaking concretely, the first lens unit $G_1$ and the third lens unit $G_3$ are displaced integrally toward the object side, whereas the second lens unit $G_2$ is displaced at a speed slower than that of the first lens unit $G_1$ so as to widen the airspace reserved between these lens units.

At the wide position shown in FIG. 1A, the first lens unit $G_1$ and second lens unit $G_2$ have a positive total power, and compose a telephoto type lens system in combination with the third lens unit $G_3$ having negative refractive power, thereby enabling to shorten total length of the zoom lens system.

In case of a lens system wherein refractive powers are distributed as described above, it is possible to obtain a compact zoom lens system and correct aberrations favorably therein by designing the lens system so as to satisfy the above-mentioned conditions (1), (2) and (3).

The condition (1) defines focal length of the first lens unit. If the lower limit of the condition (1) is exceeded, back focal length will be shortened and outside diameter of the third lens unit will be enlarged. Further, lateral chromatic aberration of the lens system will be aggravated, thereby degrading the offaxial performance thereof. On the other hand, if the upper limit of the condition (1) is exceeded, Petzval's sum of the lens system as a whole will be deviated toward the negative side and curvature of field will be overcorrected.

The condition (2) defines focal length of the second lens unit. If the second lens unit has power strong enough to make $f_2/f_w$ smaller than the lower limit of the condition (2), aberrations such as spherical aberration and coma will be aggravated. In order to correct these aberrations, it will be necessary to increases the number of the lens components constituting the second lens unit, thereby undesirably enhancing manufacturing cost of the lens system. If the second lens unit has power weak enough to make $f_2/f_w$ larger than the upper limit of the condition (2), the lens system will have a long total length contrary to the object of the present invention.

The condition (3) defines ratio between focal length of the first lens unit and focal length of the third lens unit. If the lower limit of the condition (3) is exceeded, the third lens unit is apt to have strong power which is advantageous to shorten total length of the lens system as a whole, but Petzval's sum will be deviated toward the negative side, curvature of field will be overcorrected and the image surface will be varied remarkably by varying focal length. On the other hand, if $f_1/|f_3|$ exceeds the upper limit of the condition (3), it will be advantageous for correcting aberrations, but the lens system will have a long total length contrary to the object of the present invention.

For the zoom lens system according to the present invention so designed as to satisfy the conditions of refractive power distribution described above, it is desirable to compose the respective lens units as described below.

It is preferable to compose the first lens unit of a negative meniscus lens component convex on the object side and a positive meniscus lens component convex on the object side, to compose the second lens unit of a negative lens component, a positive lens component, an aperture stop, a positive lens component, a biconcave lens componnet and a positive lens component, and to compose the third lens unit of a positive meniscus lens component convex on the image side and a negative meniscus lens component convex on the image side. In addition, the third lens unit may be composed of a single negative lens component and the lens components arranged in the first lens unit may be cemented to each other or separated from each other.

In order to correct aberrations more favorably in the zoom lens system described above, it is desirable to use, in the second lens unit, at least one aspherical surface having such a shape as to strengthen negative power as the lens surface portions are farther from the optical axis.

Further, it is desirable to design the zoom lens system according to the present invention so as to satisfy the following condition (4):

$$0 < (r_5 - r_6)/(r_5 + r_6) < 1 \qquad (4)$$

wherein the reference symbol $r_5$ represents radius of curvature on the image side surface of the negative lens component arranged on the extremely object side in the second lens unit and the reference symbol $r_6$ designates radius of curvature on the object side surface of the positive lens component arranged on the object side in the second lens unit.

The condition (4) defines shape of the air lens formed between the negative lens component and the positive lens component arranged on the object side of the stop in the second lens unit, and is required for correcting mainly spherical aberration.

If the lower limit of the condition (4) is exceeded, the aberrations of high orders produced by the air lens will be overcorrected and cannot be corrected by the other surfaces. In addition, important influence will be caused by manufacturing error and assembly of the lens system will be difficult. On the other hand, if the upper limit of the condition (4) is exceeded, the correcting function of the air lens will be weakened, thereby making it impossible to correct aberrations with good balance in the zoom lens system as a whole.

Further, it is preferable for minimizing variation of the aberrations to perform focusing by displacing the second lens unit.

Furthermore, when the direction along the optical axis is taken as the Z axis and the direction perpendicular to the optical axis is taken as the y axis, by the following formula:

$$z = y^2/(R + \sqrt{R^2 - y^2}) + A_4 y^4 + A_6 y^6 + A_8 y^8$$

wherein the reference symbol R represents radius of curvature on the vertex of the aspherical surface, and the reference symbols $A_4$, $A_6$ and $A_8$ designate the coefficients of aspherical surface of fourth, sixth, eighth, . . . orders, respectively.

DETAILED DESCRIPTION OF THE PREFERRED EMBODIMENTS

Now, the preferred embodiments of the present invention will be described below in the form of numerical data:

Embodiment 1

-continued f = 35-70 mm, F/3.68-F/6.7 2ω = 63.4°-34.3°

| | | | |
|---|---|---|---|
| $r_1 = 22.1530$ | | | |
| | $d_1 = 1.7000$ | $n_1 = 1.80518$ | $\nu_1 = 25.43$ |
| $r_2 = 14.5050$ | | | |
| | $d_2 = 4.5000$ | $n_2 = 1.80440$ | $\nu_2 = 39.58$ |
| $r_3 = 22.7760$ | | | |
| | $d_3 = D_1$ (variable) | | |
| $r_4 = -36.9650$ | | | |
| | $d_4 = 1.0400$ | $n_3 = 1.81554$ | $\nu_3 = 44.36$ |
| $r_5 = 158.5280$ | | | |
| | $d_5 = 0.6700$ | | |
| $r_6 = 41.6370$ | | | |
| | $d_6 = 2.3200$ | $n_4 = 1.68893$ | $\nu_4 = 31.08$ |
| $r_7 = -61.7030$ | | | |
| | $d_7 = 1.4100$ | | |
| $r_8 = \infty$ (stop) | | | |
| | $d_8 = 2.5800$ | | |
| $r_9 = 86.9580$ | | | |
| | $d_9 = 1.9100$ | $n_5 = 1.62299$ | $\nu_5 = 58.14$ |
| $r_{10} = -28.6000$ | | | |
| | $d_{10} = 1.4800$ | | |
| $r_{11} = -11.4510$ (aspherical surface) | | | |
| | $d_{11} = 1.0000$ | $n_6 = 1.58362$ | $\nu_6 = 30.37$ |
| $r_{12} = 82.8850$ | | | |
| | $d_{12} = 1.0000$ | | |
| $r_{13} = 516.4730$ | | | |
| | $d_{13} = 3.4400$ | $n_7 = 1.67003$ | $\nu_7 = 47.25$ |
| $r_{14} = -11.6220$ | | | |
| | $d_{14} = D_2$ (variable) | | |
| $r_{15} = -27.9860$ | | | |
| | $d_{15} = 3.9900$ | $n_8 = 1.58144$ | $\nu_8 = 40.75$ |
| $r_{16} = -17.1040$ | | | |
| | $d_{16} = 2.8100$ | | |
| $r_{17} = -16.9780$ | | | |
| | $d_{17} = 1.5400$ | $n_9 = 1.77250$ | $\nu_9 = 49.66$ |
| $r_{18} = -430.8720$ | | | | aspherical surface coefficient
$A_4 = -0.97451 \times 10^{-4}$
$A_6 = -0.18667 \times 10^{-6}$
$A_8 = -0.25691 \times 10^{-7}$

| f | 35 | 50 | 70 |
|---|---|---|---|
| $D_1$ | 2.815 | 10.581 | 16.151 |
| $D_2$ | 13.905 | 6.139 | 0.568 |

$f_1/|f_3| = 5.408,$  $f_2/fw = 0.767$
$f_1/fw = 5.309,$  $(r_5 - r_6)/(r_5 + r_6) = 0.584$

Embodiment 2
f = 35-70 mm, F/3.8-F/6.7 2ω = 63.4°-34.3°

| | | | |
|---|---|---|---|
| $r_1 = 18.7030$ | | | |
| | $d_1 = 1.7000$ | $n_1 = 1.84666$ | $\nu_1 = 23.78$ |
| $r_2 = 14.6500$ | | | |
| | $d_2 = 3.5000$ | $n_2 = 1.72916$ | $\nu_2 = 54.68$ |
| $r_3 = 21.5100$ | | | |
| | $d_3 = D_1$ (variable) | | |
| $r_4 = -35.2610$ | | | |
| | $d_4 = 1.0100$ | $n_3 = 1.77250$ | $\nu_3 = 49.66$ |
| $r_5 = 328.7610$ | | | |
| | $d_5 = 0.6700$ | | |
| $r_6 = 35.4710$ (aspherical surface) | | | |
| | $d_6 = 2.3200$ | $n_4 = 1.58362$ | $\nu_4 = 30.37$ |
| $r_7 = -279.9140$ | | | |
| | $d_7 = 1.0000$ | | |
| $r_8 = \infty$ (stop) | | | |
| | $d_8 = 1.0000$ | | |
| $r_9 = 293.3950$ | | | |
| | $d_9 = 1.9500$ | $n_5 = 1.65844$ | $\nu_5 = 50.86$ |
| $r_{10} = -17.9530$ | | | |
| | $d_{10} = 1.4800$ | | |
| $r_{11} = -13.2800$ (aspherical surface) | | | |
| | $d_{11} = 1.0000$ | $n_6 = 1.58362$ | $\nu_6 = 30.37$ |
| $r_{12} = 34.4990$ | | | |
| | $d_{12} = 0.5000$ | | |
| $r_{13} = 70.2700$ | | | |
| | $d_{13} = 4.0400$ | $n_7 = 1.68578$ | $\nu_7 = 44.00$ |
| $r_{14} = -14.0480$ | | | |
| | $d_{14} = D_2$ (variable) | | |
| $r_{15} = -19.0100$ | | | |
| | $d_{15} = 2.9900$ | $n_8 = 1.59270$ | $\nu_8 = 35.29$ |
| $r_{16} = -15.1430$ | | | |
| | $d_{16} = 3.3000$ | | |
| $r_{17} = -17.5050$ | | | |
| | $d_{17} = 1.4900$ | $n_9 = 1.72000$ | $\nu_9 = 50.25$ |
| $r_{18} = -1019.3180$ | | | | aspherical surface coefficient
(6th surface)
$A_4 = -0.62216 \times 10^{-4}$
$A_6 = -0.25699 \times 10^{-7}$
$A_8 = -0.88869 \times 10^{-8}$
(11th surface)
$A_4 = -0.11551 \times 10^{-4}$
$A_6 = -0.76535 \times 10^{-6}$
$A_8 = 0.22557 \times 10^{-7}$

| f | 35 | 50 | 70 |
|---|---|---|---|
| $D_1$ | 2.949 | 9.978 | 15.108 |
| $D_2$ | 12.798 | 5.769 | 0.639 |

$f_1/|f_3| = 4.059,$  $f_2/fw = 0.788$
$f_1/fw = 3.723,$  $(r_5 - r_6)/(r_5 + r_6) = 0.805$

Embodiment 3
f = 35-70 mm, F/3.8-F/6.7 2ω = 63.4°-34.3°

| | | | |
|---|---|---|---|
| $r_1 = 20.3660$ | | | |
| | $d_1 = 1.7000$ | $n_1 = 1.80518$ | $\nu_1 = 25.43$ |
| $r_2 = 16.1500$ | | | |
| | $d_2 = 3.5000$ | $n_2 = 1.72916$ | $\nu_2 = 54.68$ |
| $r_3 = 23.0060$ | | | |
| | $d_3 = D_1$ (variable) | | |
| $r_4 = -26.9030$ | | | |
| | $d_4 = 1.0300$ | $n_3 = 1.58362$ | $\nu_3 = 30.37$ |
| $r_5 = 94.5830$ | | | |
| | $d_5 = 0.2600$ | | |
| $r_6 = 34.8070$ | | | |
| | $d_6 = 2.0000$ | $n_4 = 1.80518$ | $\nu_4 = 25.43$ |
| $r_7 = -118.9960$ | | | |
| | $d_7 = 1.0000$ | | |
| $r_8 = \infty$ (stop) | | | |
| | $d_8 = 1.0000$ | | |
| $r_9 = 2301.3310$ | | | |
| | $d_9 = 1.7600$ | $n_5 = 1.49216$ | $\nu_5 = 57.50$ |
| $r_{10} = -17.0750$ (aspherical surface) | | | |
| | $d_{10} = 1.4800$ | | |
| $r_{11} = -12.3480$ | | | |
| | $d_{11} = 1.0400$ | $n_6 = 1.64769$ | $\nu_6 = 33.80$ |
| $r_{12} = 70.7820$ | | | |
| | $d_{12} = 1.0600$ | | |
| $r_{13} = 177.8460$ | | | |
| | $d_{13} = 3.4000$ | $n_7 = 1.67790$ | $\nu_7 = 55.33$ |
| $r_{14} = -12.2630$ | | | |
| | $d_{14} = D_2$ (variable) | | |
| $r_{15} = -25.6530$ | | | |
| | $d_{15} = 3.0200$ | $n_8 = 1.59270$ | $\nu_8 = 35.29$ |
| $r_{16} = -17.8500$ | | | |
| | $d_{16} = 3.0000$ | | |
| $r_{17} = -18.6750$ | | | |
| | $d_{17} = 1.4800$ | $n_9 = 1.72916$ | $\nu_9 = 54.68$ |
| $r_{18} = -10985.9690$ | | | | aspherical surface coefficient
$A_4 = 0.10932 \times 10^{-3}$
$A_6 = 0.72590 \times 10^{-6}$
$A_8 = 0.67912 \times 10^{-8}$

| f | 35 | 50 | 70 |
|---|---|---|---|
| $D_1$ | 3.280 | 11.399 | 17.323 |

-continued

| | | |
|---|---|---|
| $D_2$ | 14.578 | 6.459 | 0.535 |

$f_1/|f_3| = 4.125$, $\quad f_2/fw = 0.823$
$f_1/fw = 4.242$, $\quad (r_5 - r_6)/(r_5 + r_6) = 0.462$ Embodiment 4
$f = 35-70$ mm, $\quad F/4.2-F/6.7 \quad 2\omega = 63.4°-34.3°$ $r_1 = 23.2390$
$\quad d_1 = 1.7000 \quad n_1 = 1.80518 \quad \nu_1 = 25.43$
$r_2 = 14.9000$
$\quad d_2 = 5.3000 \quad n_2 = 1.79952 \quad \nu_2 = 42.24$
$r_3 = 29.0450$
$\quad d_3 = D_1$ (variable)
$r_4 = -24.8290$
$\quad d_4 = 1.0000 \quad n_3 = 1.74950 \quad \nu_3 = 35.27$
$r_5 = 127.3360$
$\quad d_5 = 0.6700$
$r_6 = 38.8680$
$\quad d_6 = 2.3000 \quad n_4 = 1.67270 \quad \nu_4 = 32.10$
$r_7 = -28.2130$
$\quad d_7 = 1.9600$
$r_8 = \infty$ (stop)
$\quad d_8 = 2.2200$
$r_9 = -137.9140$
$\quad d_9 = 1.9100 \quad n_5 = 1.62230 \quad \nu_5 = 53.20$
$r_{10} = -23.0300$
$\quad d_{10} = 1.5000$
$r_{11} = -10.6100$ (aspherical surface)
$\quad d_{11} = 1.0000 \quad n_6 = 1.58362 \quad \nu_6 = 30.37$
$r_{12} = 204.8640$
$\quad d_{12} = 1.0000$
$r_{13} = -238.9280$
$\quad d_{13} = 3.4700 \quad n_7 = 1.68578 \quad \nu_7 = 44.00$
$r_{14} = -11.9490$
$\quad d_{14} = D_2$ (variable)
$r_{15} = -37.6720$
$\quad d_{15} = 1.7000 \quad n_8 = 1.69680 \quad \nu_8 = 55.52$
$r_{16} = 113.8160$ aspherical surface coefficient
$A_4 = -0.65112 \times 10^{-4}$
$A_6 = -0.71680 \times 10^{-6}$
$A_8 = -0.14430 \times 10^{-7}$

| f | 35 | 50 | 70 |
|---|---|---|---|
| $D_1$ | 1.677 | 10.580 | 17.478 |
| $D_2$ | 17.547 | 8.643 | 1.745 |

$f_1/|f_3| = 2.371$, $\quad f_2/fw = 0.867$
$f_1/fw = 2.739$, $\quad (r_5 - r_6)/(r_5 + r_6) = 0.532$ Embodiment 5
$f = 35-70$ mm, $\quad F/3.8-F/6.7 \quad 2\omega = 63.4°-34.3°$ $r_1 = 20.3130$
$\quad d_1 = 1.7000 \quad n_1 = 1.80518 \quad \nu_1 = 25.43$
$r_2 = 15.4420$
$\quad d_2 = 3.5000 \quad n_2 = 1.77250 \quad \nu_2 = 49.66$
$r_3 = 21.9810$
$\quad d_3 = D_1$ (variable)
$r_4 = -33.2750$
$\quad d_4 = 1.0400 \quad n_3 = 1.74400 \quad \nu_3 = 44.73$
$r_5 = 318.0780$
$\quad d_5 = 0.7000$
$r_6 = 28.1850$
$\quad d_6 = 2.3000 \quad n_4 = 1.74077 \quad \nu_4 = 27.79$
$r_7 = 118.5580$
$\quad d_7 = 1.0000$
$r_8 = \infty$ (stop)
$\quad d_8 = 1.0000$
$r_9 = 46.2700$
$\quad d_9 = 1.9100 \quad n_5 = 1.49216 \quad \nu_5 = 57.50$
$r_{10} = -20.0550$ (aspherical surface)
$\quad d_{10} = 1.3700$
$r_{11} = -11.8090$
$\quad d_{11} = 1.0000 \quad n_6 = 1.58362 \quad \nu_6 = 30.37$
$r_{12} = 79.2420$ (aspherical surface)
$\quad d_{12} = 1.0000$
$r_{13} = 274.1670$
$\quad d_{13} = 3.6100 \quad n_7 = 1.75700 \quad \nu_7 = 47.87$
$r_{14} = -14.2780$
$\quad d_{14} = D_2$ (variable)
$r_{15} = -24.6610$
$\quad d_{15} = 3.0500 \quad n_8 = 1.61659 \quad \nu_8 = 36.63$
$r_{16} = -17.1470$
$\quad d_{16} = 3.2400$
$r_{17} = -17.3410$
$\quad d_{17} = 1.5000 \quad n_9 = 1.72600 \quad \nu_9 = 53.56$
$r_{18} = -752.2220$ aspherical surface coefficient
(10th surface)
$A_4 = 0.32739 \times 10^{-5}$
$A_6 = 0.99758 \times 10^{-6}$
$A_8 = -0.14751 \times 10^{-7}$
(12th surface)
$A_4 = 0.54808 \times 10^{-4}$
$A_6 = -0.50322 \times 10^{-6}$
$A_8 = 0.52177 \times 10^{-8}$

| f | 35 | 50 | 70 |
|---|---|---|---|
| $D_1$ | 2.803 | 10.732 | 16.485 |
| $D_2$ | 14.239 | 6.310 | 0.557 |

$f_1/|f_3| = 4.464$, $\quad f_2/fw = 0.810$
$f_1/fw = 4.479$, $\quad (r_5 - r_6)/(r_5 + r_6) = 0.837$ wherein the reference symbols $r_1, r_2, \ldots$ represent radii of curvature on the surfaces of the respective lens components, the reference symbols $d_1, d_2, \ldots$ designate thicknesses of the respective lens components and airspaces reserved therebetween, the reference symbols $n_1, n_2, \ldots$ denote refractive indices of the respective lens components, and the reference symbols $\nu_1, \nu_2; \ldots$ represent Abbe's numbers of the respective lens components.

Figure 2:
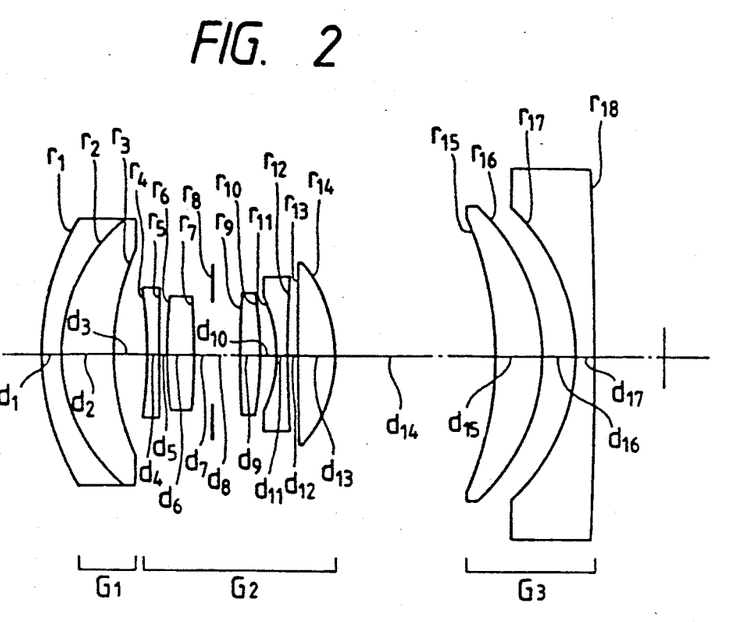
FIG. 2 shows a sectional view illustrating Embodiments 1, 2, 3 and 5 of the zoom lens system according to the present invention.

Out of the Embodiments describes above, each of the Embodiments 1 through 3 has the composition illustrated in FIG. 2 wherein the first lens unit consists of a negative meniscus lens component convex on the object side and a positive meniscus lens component convex on the object side which are cemented to each other. The second lens unit consists of a negative lens component, a positive lens component, a stop, a positive lens component, a negative biconcave lens component and a positive lens component, whereas the third lens unit consists of a positive meniscus lens component convex on the image side and a negative meniscus lens component convex on the image side.

Each of the Embodiments 1 through 3 comprises an aspherical surface or aspherical surfaces in the second lens unit. Speaking concretely, the Embodiment 1 comprises an aspherical surface designed as the object side surface of the biconcave lens component arranged in the second lens unit, the Embodiment 2 comprises aspherical surfaces designed as the object side surface of the positive lens component arranged on the object side of the stop and the object side surface of the biconcave lens component arranged in the second lens unit, and the Embodiment 3 comprises an aspherical surface designed as the image side surface of the positive lens component arranged just after the stop in the second lens unit.

Figure 4:
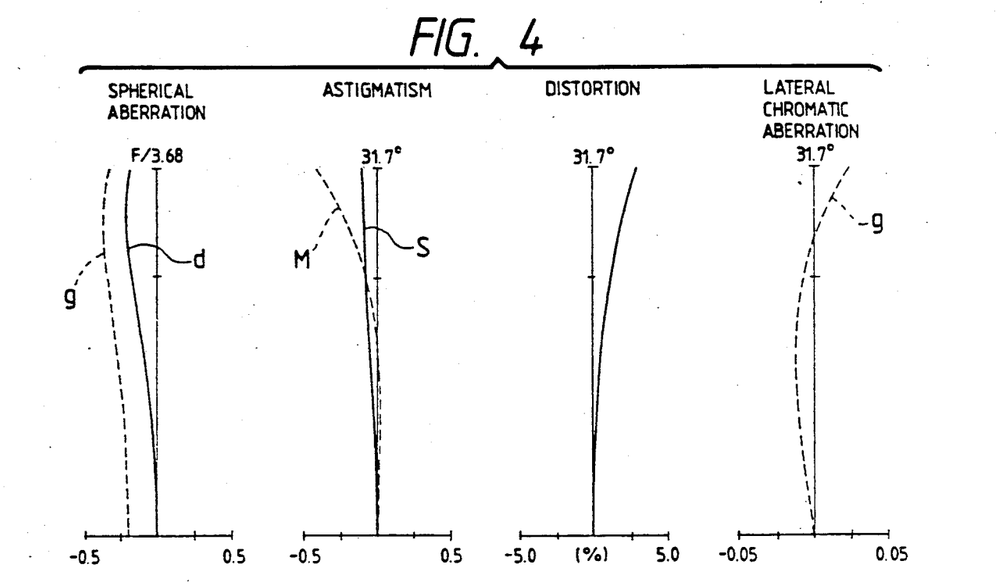
FIG. 4 through FIG. 6 show graphs illustrating aberration characteristics of the Embodiment 1 of the present invention.
Figure 5:
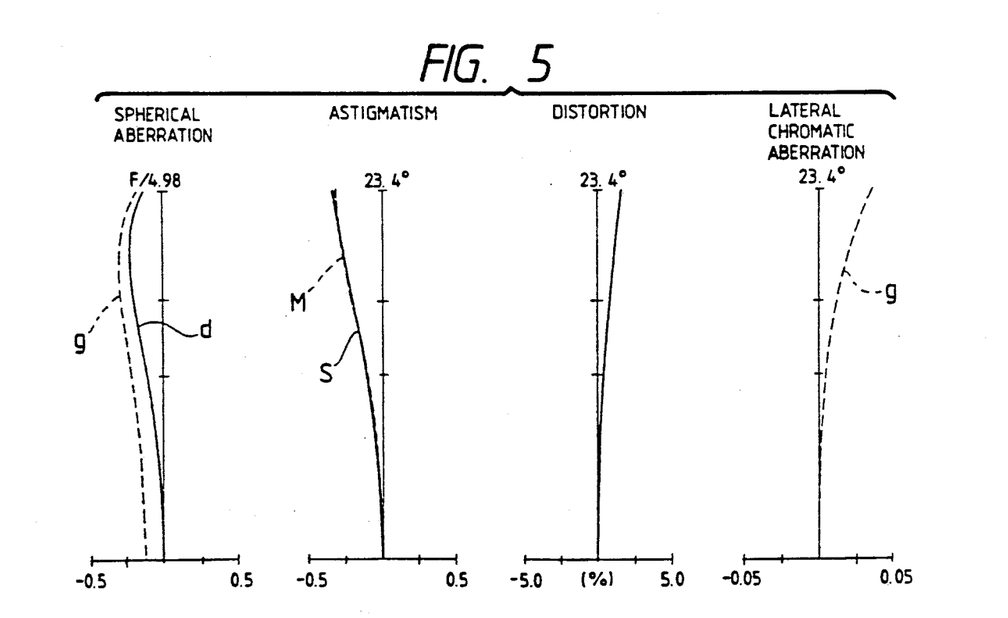
Figure 6:
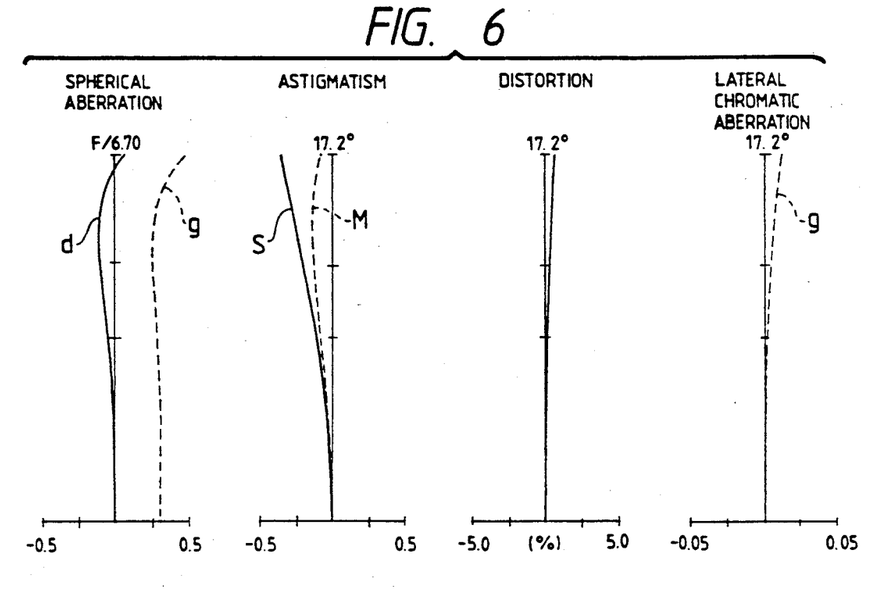
Figure 7:
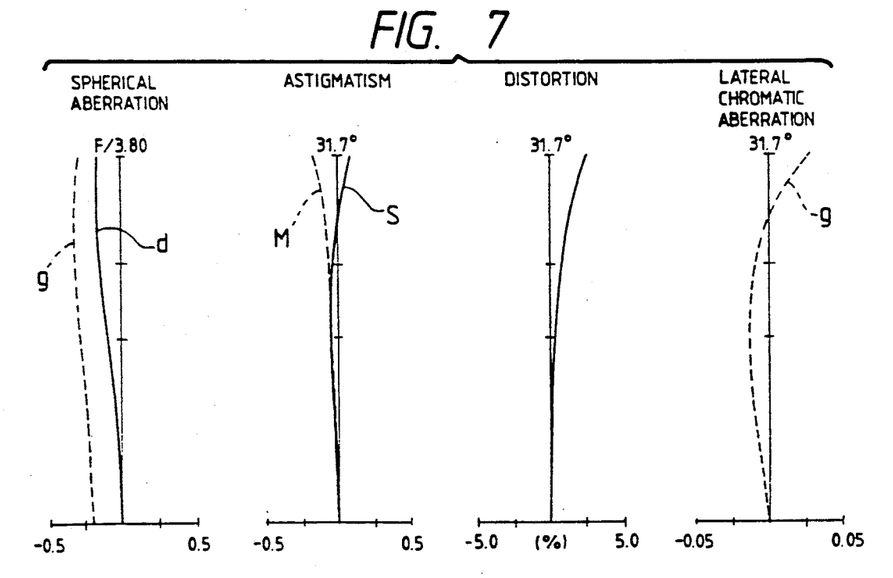
FIG. 7 through FIG. 9 shows graphs illustrating aberration characteristics of the Embodiment 2 of the present invention.
Figure 8:
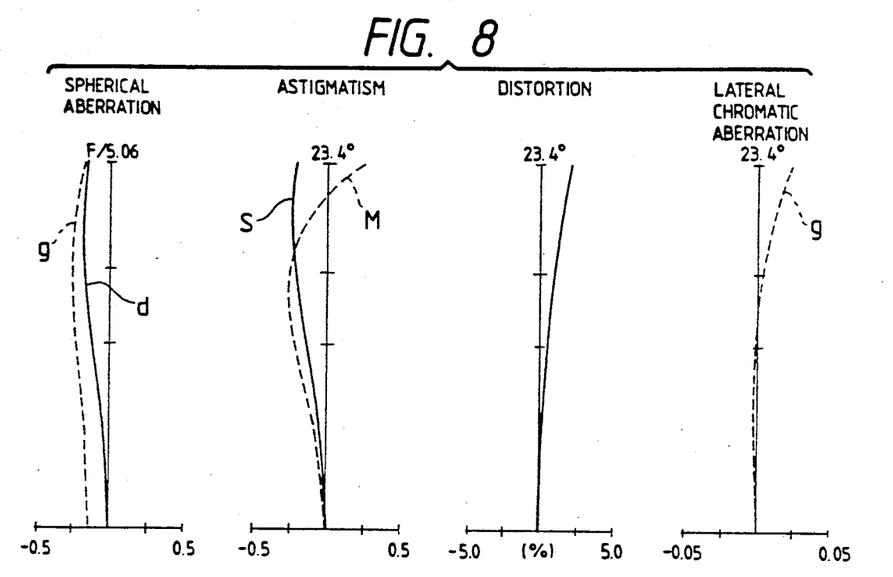
Figure 9:
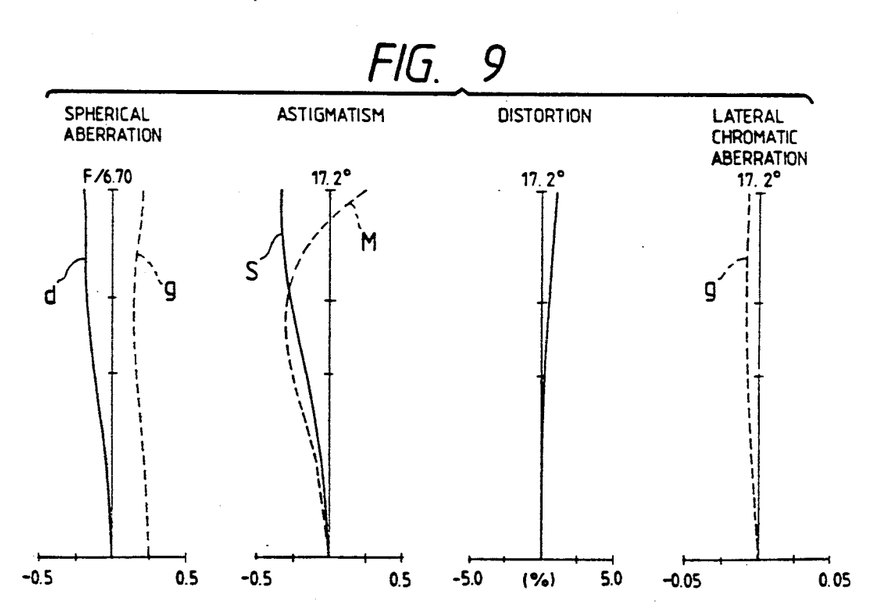
Figure 10:
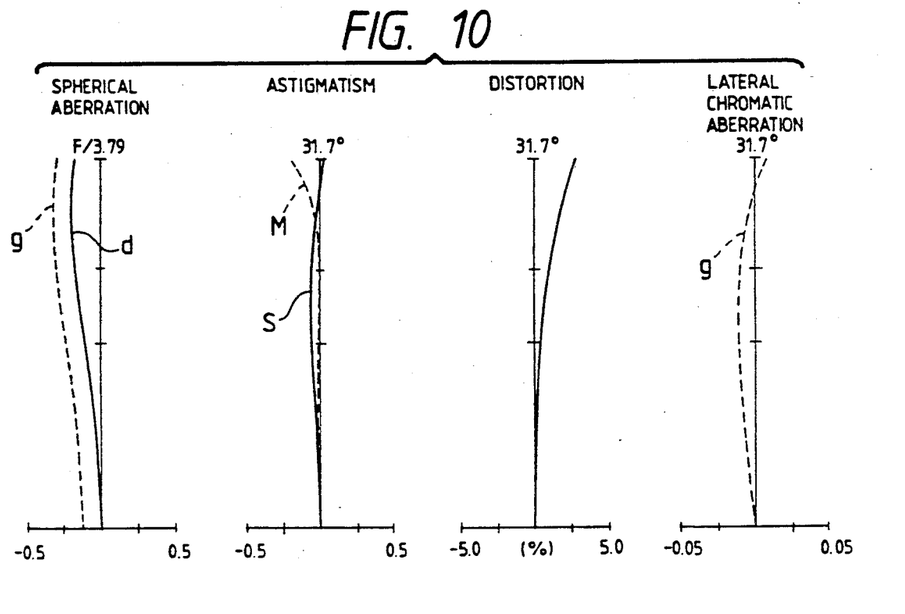
FIG. 10 through FIG. 12 show curves illustrating aberration characteristics of the Embodiment 3 of the present invention.
Figure 11:
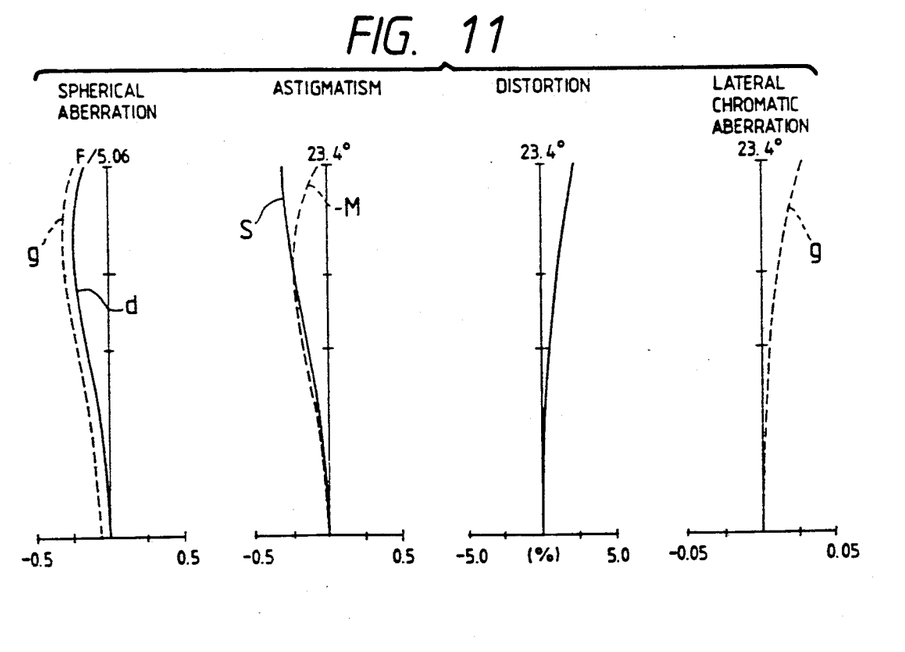
Figure 12:
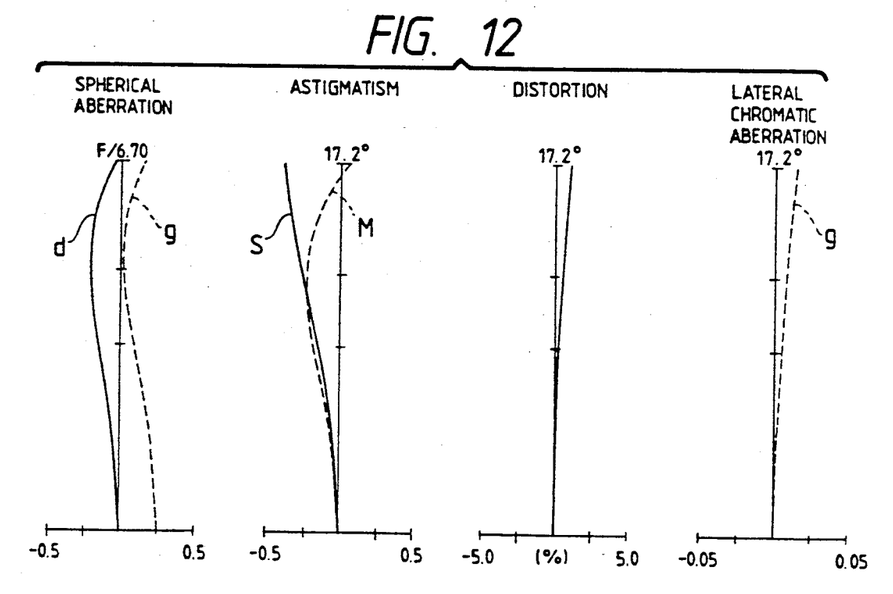

Aberration characteristics at the wide position, intermediate focal length and tele position of the Embodiment 1 are illustrated in FIG. 4, FIG. 5 and FIG. 6 respectively, aberration characteristics at the wide position, intermediate focal length and tele position of the Embodiment 2 are illustrated in FIG. 7, FIG. 8 and FIG. 9 respectively, and aberration characteristics at the wide position, intermediate focal length and tele position of the Embodiment 3 are visualized in FIG. 10, FIG. 11 and FIG. 12 respectively.

Figure 3:
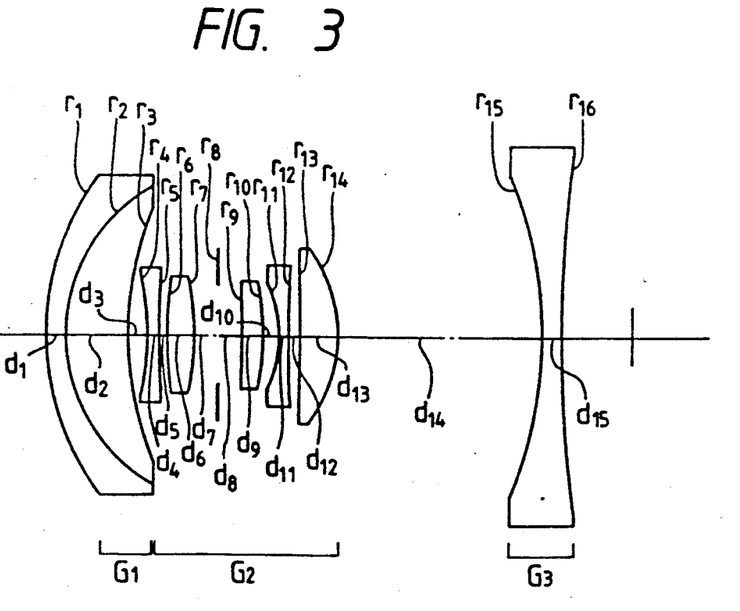
FIG. 3 shows a sectional view illustrating Embodiment 4 of the zoom lens system according to the present invention.

The Embodiment 4 has the composition illustrated in FIG. 3 wherein the third lens unit consists of a single lens component. Further, the object side surface of the biconcave lens component arranged in the second lens unit is designed as an aspherical surface.

Figure 13:
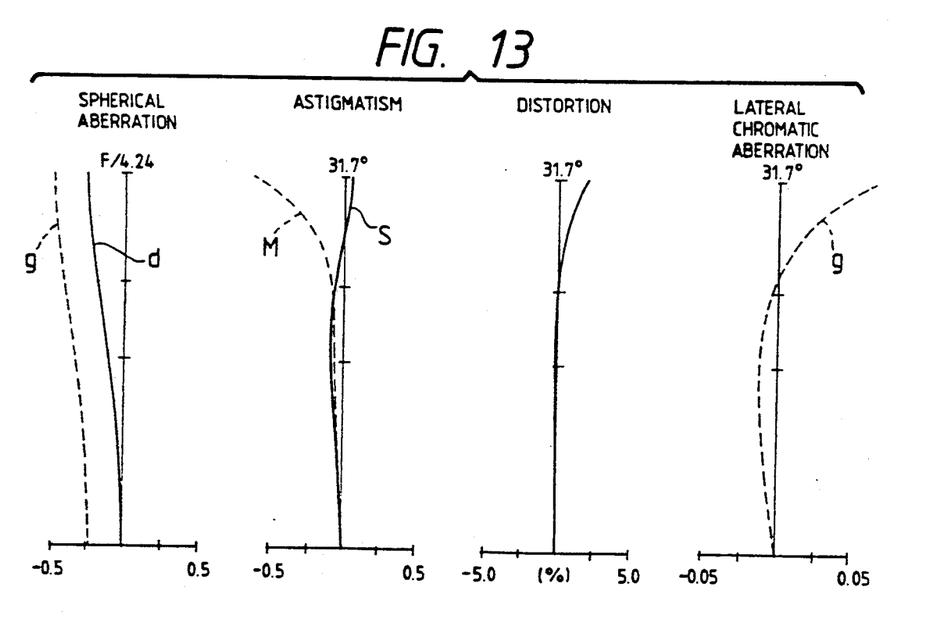
FIG. 13 through FIG. 15 show curves illustrating aberration characteristics of the Embodiment 4 of the present invention.
Figure 14:
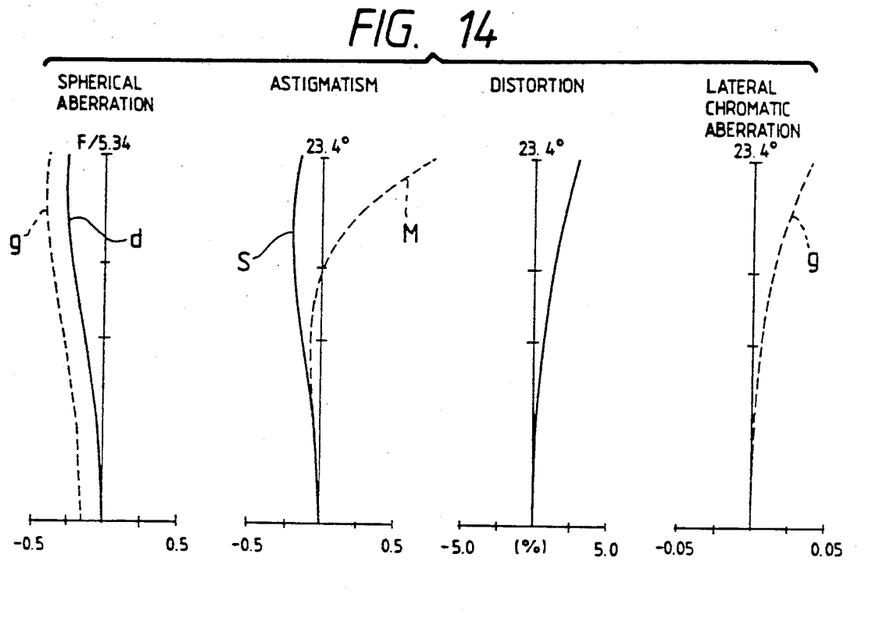
Figure 15:
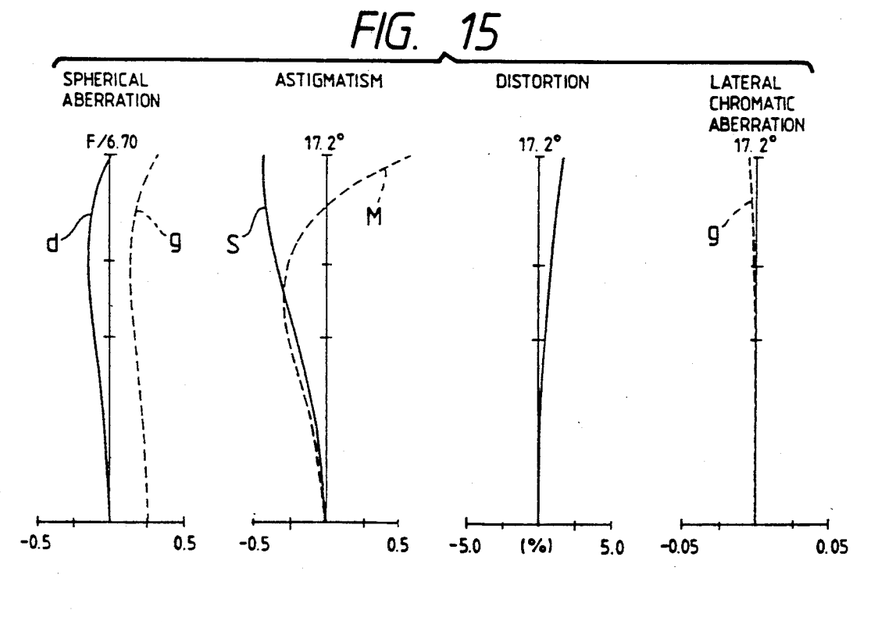

Aberration characteristics at the wide position, intermediate focal length and tele position of the Embodiment 4 are illustrated in FIG. 13, FIG. 14 and FIG. 15 respectively.

The Embodiment 5 has the composition shown in FIG. 2 which is similar to the compositions of the Embodiments 1 through 3. In the Embodiment 5, the image side surface of the positive lens component arranged just after the stop and the image side surface of the biconcave lens component arranged in the second lens unit are designed as aspherical surfaces.

Figure 16:
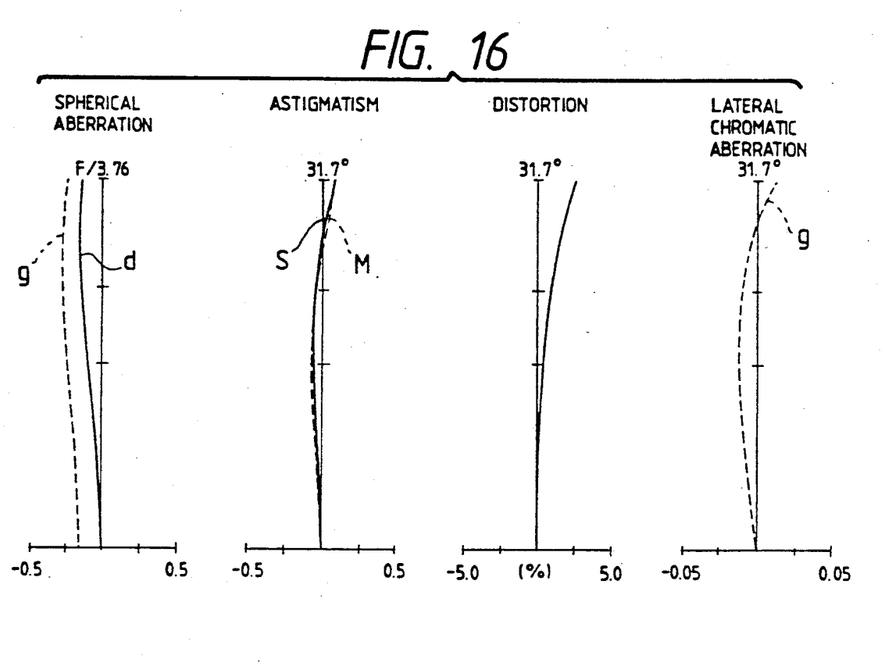
FIG. 16 through FIG. 18 show graphs illustrating aberration characteristics of the Embodiment 5 of the present invention.
Figure 17:
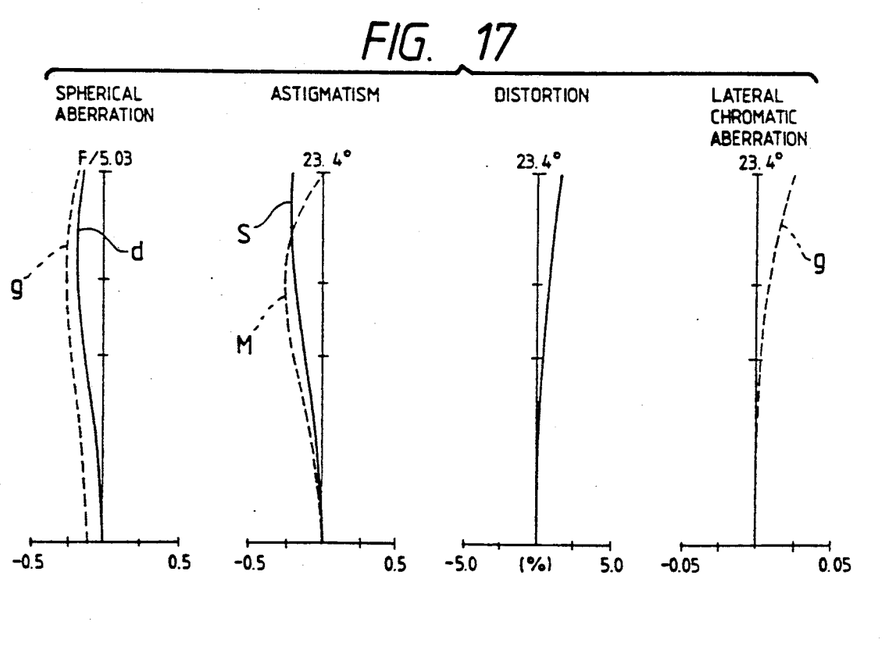
Figure 18:
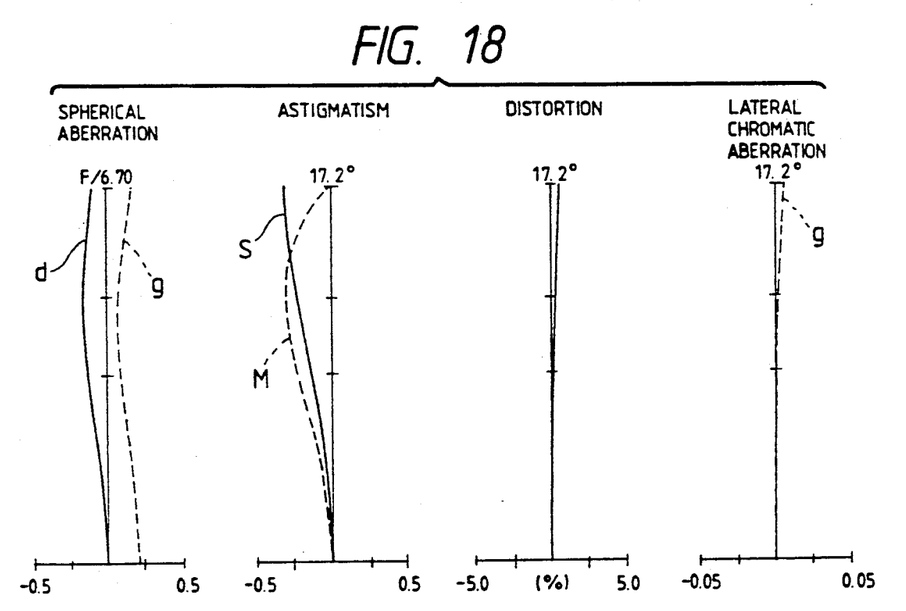

Aberration characteristics at the wide position, intermediate focal length and tele position of the Embodiment 5 are illustrated in FIG. 16, FIG. 17 and FIG. 18 respectively.

The zoom lens system according to the present invention is simple in the composition thereof, can be zoomed by simple displacement of the lens units and permits simplifying the driving system therefor, and has a high vari-focal ratio, a compact design and favorable performance.

I claim:

1. A zoom lens system comprising:
   in the recited order from the object side, a first lens unit having positive refractive power, a second lens unit having positive refractive power and a third lens unit having negative refractive power, and
   means for varying focal length by displacing said first lens unit integrally with said third lens unit toward the object side and displacing said second lens unit toward the object side at a speed slower than that of said first lens unit,
   said zoom lens system satisfying the following conditions (1) through (3):

$$2.5 < f_1/fw < 6 \tag{1}$$

$$0.6 < f_2/fw < 1 \tag{2}$$

$$2 < f_1/f_3/ < 7 \tag{3}$$

wherein the reference symbols $f_1$, $f_2$ and $f_3$ represent focal lengths of the first lens unit, the second lens unit and the third lens unit respectively, and the reference symbol fw designates focal length of the zoom system as a whole at the wide position thereof.

2. A zoom lens system according to claim 1 wherein said first lens unit comprises a negative meniscus lens component convex on the object side and a positive meniscus lens component convex on the object side, said second lens unit consists of a negative lens component, a positive lens component, a stop, a positive lens component, a biconcave lens component and a positive lens component, and said third lens unit consists of a negative meniscus lens component convex on the image side and a meniscus lens component convex on the image side.

3. A zoom lens system according to claim 2 satisfying the following condition (4):

$$0 < (r_5 - r_6)/(r_5 + r_6) < 1 \tag{4}$$

wherein the reference symbol $r_5$ represents radius of curvature on the image side surface of the negative lens component arranged on the extremely object side in the second lens unit and the reference symbol $r_6$ designates radius of curvature on the object side surface of the positive lens component arranged on the image side of said negative lens.

4. A zoom lens system according to claim 3, wherein the object side surface of the biconcave lens component arranged in the second lens unit is designed as an aspherical surface.

5. A zoom lens system according to claim 3 wherein the object side surface of the positive lens component and the object side surface of the biconcave lens component arranged on the object side of the stop in the second lens unit are designed as aspherical surfaces respectively.

6. A zoom lens system according to claim 3 wherein the image side surface of the positive lens component arranged just after the stop in the second lens unit is designed as an aspherical surface.

7. A zoom lens system according to claim 1 wherein at least one surface in the second lens unit is an aspherical surface having negative power strengthened as the surface portions are farther from the optical axis.

* * * * *

UNITED STATES PATENT AND TRADEMARK OFFICE
CERTIFICATE OF CORRECTION

PATENT NO. : 5,069,536

DATED : December 3, 1991

INVENTOR(S) : Yasuji Ogata

It is certified that error appears in the above-identified patent and that said Letters Patent is hereby corrected as shown below:

Column 10, line 4, condition (3) should appear as follows:

$$2 < f_1 / |f_3| < 7 \qquad (3)$$

Signed and Sealed this

Fourteenth Day of September, 1993

*Attest:*

BRUCE LEHMAN

*Attesting Officer*     *Commissioner of Patents and Trademarks*